Nov. 20, 1962 G. J. DEAN 3,065,387
CAMERA SHUTTER-TIMING APPARATUS
Filed March 5, 1953
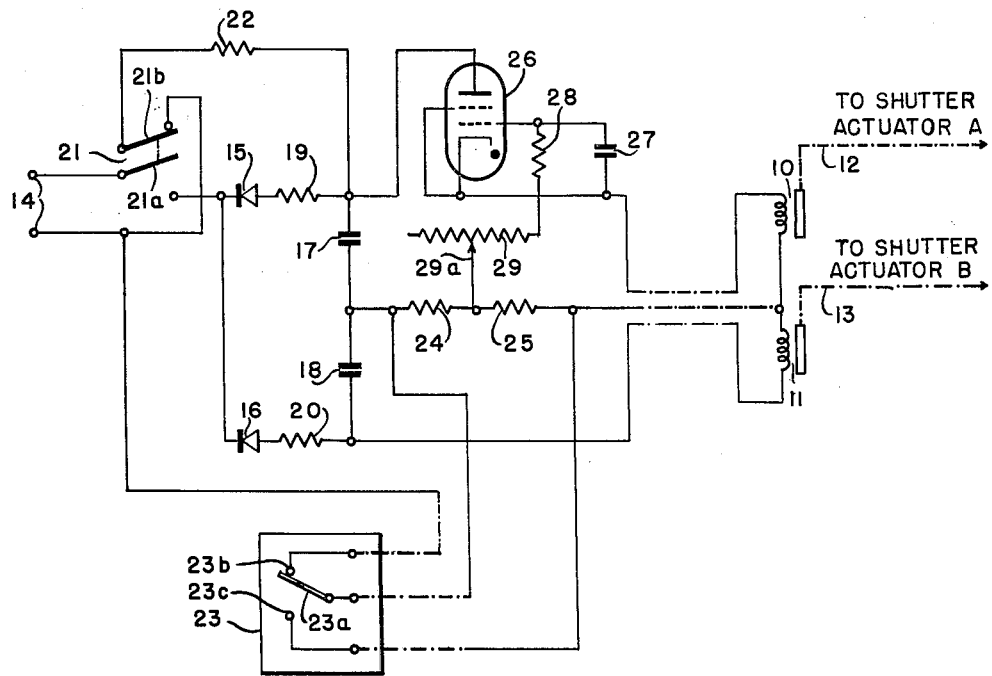
INVENTOR.
GEORGE J. DEAN
BY *Laurence B. Dodds*
ATTORNEY

United States Patent Office 3,065,387
Patented Nov. 20, 1962

3,065,387
CAMERA SHUTTER-TIMING APPARATUS
George J. Dean, Ozone Park, N.Y., assignor to Fairchild Camera and Instrument Corporation, a corporation of Delaware
Filed Mar. 5, 1953, Ser. No. 340,571
8 Claims. (Cl. 317—142)

This invention relates to camera shutter-timing apparatus and, while it is of general application, it is particularly suitable for use with aerial cameras located in a position in the plane remote from the photographer.

In aerial photography it is highly desirable to provide apparatus which enables the operator during flight readily and precisely to determine the exposure time of the camera over a range of values. One such combined shutter and timing mechanism designed for this purpose is described and claimed in the copending application of Frederick P. Willcox, Serial No. 125,453, filed November 4, 1949, now Patent No. 2,691,331, entitled "Drawer Type High Speed Inter-Lens Shutter," and assigned to the same assignee as the present application. Essentially that shutter and timer comprise two separate sets of shutter blades, one of which is initially in the closed position and is spring-biased to open position and the other of which is initially in the open position and spring-biased to closed position. Suitable latches prevent the shutters from moving under their respective spring biases. The latch associated with the first set of shutter blades is tripped in any suitable manner to initiate an exposure, while an adjustable cam associated with the driving mechanism for the first set of shutter blades trips the latch holding the second set of shutter blades to complete the exposure. Adjustment of the cam varies the point in the operating cycle of the first set of shutter blades at which the second latch is tripped and thus the duration of the exposure.

While the shutter and timer of aforesaid copending application is entirely satisfactory for many aerial camera applications, there are some applications for which that apparatus leaves something to be desired. For example, some aerial cameras are installed in portions of the plane that are relatively inaccessible to the operator, while the exposure time of such aerial cameras of the prior art is not readily adjustable from a remote point. Furthermore, the camera may be installed in a portion of the plane subject to wide variations in temperature, humidity, atmospheric pressure, etc., which may affect the speed of operation of the timer or the shutter-driving mechanism, or both, and thus the accuracy of the exposure timing.

In the copending application of Irving W. Doyle, Serial No. 340,557, now abandoned, filed concurrently herewith and assigned to the same assignee as the present application, there is described and claimed an improved shutter-actuating mechanism for cameras which facilitates precise adjustment, from a remote point, of the exposure time of the camera over a range of values and including a timing apparatus which may be adjusted at the operator's station. The present invention comprises an improved and simplified timing apparatus particularly suitable for use in the shutter-actuating mechanism of the said copending Doyle application.

It is an object of the present invention, therefore, to provide a new and improved camera shutter-timing apparatus of simplified construction and improved performance.

It is another object of the invention to provide a new and improved camera shutter-timing apparatus which is particularly adapted for adjustment over a range of timing values at an operator's station remote from the shutter-actuating mechanism.

In accordance with the invention, in a camera having a shutter mechanism including two independently operable shutter-actuating elements, there is provided a shutter-timing apparatus for effecting a precisely predetermined camera exposure comprising a pair of electro-responsive devices adapted to be individually coupled to the shutter-actuating elements, an electrical supply circuit, and a pair of control circuits coupled to the supply circuit, each including one of the electro-responsive devices. The timing apparatus also includes means for developing an electrical pulse in one of the control circuits to cause its associated device to initiate an exposure, a normally non-conductive electron discharge device included in the other of the control circuits, and an electrical time-constant circuit responsive to operation of the pulse-developing means for rendering the discharge device conductive to develop a delayed pulse in the other of the control circuits to cause its associated electro-responsive device to complete an exposure.

For a better understanding of the present invention, together with other and further objects thereof, reference is had to the following description taken in connection with the accompanying drawing, while its scope will be pointed out in the appended claims.

The single FIGURE of the drawing is a schematic circuit diagram of a camera shutter-timing apparatus embodying the invention.

The timing apparatus of the drawing is adapted for application to a camera having a shutter mechanism including two independently operable shutter-actuating elements, such as the actuators A and B corresponding to the tripping elements 21 and 27 of aforesaid copending Doyle application. The shutter-timing apparatus of the drawing is capable of effecting a precisely predetermined camera exposure adjustable over a range of values and comprises a pair of electro-responsive devices, such as the electromagnets 10, 11, adapted to be individually coupled to the shutter-actuating elements A and B, respectively, as indicated by the dot-dash lines 12 and 13, respectively.

The timing apparatus of the invention also comprises an electrical supply circuit such as the terminals 14,14, preferably an alternating-current supply circuit such as customarily found on an aircraft, and a pair of rectifier circuits coupled to the supply circuit and individually including rectifier devices such as contact rectifiers 15 and 16 and energy-storing condensers 17 and 18, respectively. Load resistors 19 and 20 are individually included in the rectifier circuits described. There is also provided a single-throw double pole switch 21, one blade 21a of which is included in the connection from one of the terminals 14 to the rectifier circuits and the other blade 21b of which is connected in shunt to the condenser 17 through a resistor 22 and the blade 23a and contact 23b of a manually operable switch 23. The connection from the other of the supply terminals 14 to the rectifier circuits is also completed through the contact 23b and the blade 23a of the switch 23, the connections being such that, when the switch blade 21a is closed, the supply circuit terminals are effectively connected between the junction of the rectifier devices 15 and 16 and the junction of the condensers 17 and 18 to form a conventional full-wave rectifying circuit.

The timing apparatus of the invention also includes a pair of high-impedance control circuits coupled to the supply terminals 14, 14, each including one of the electro-responsive devices or electromagnets 10, 11. Specifically, the electromagnet 10 is coupled across the condenser 17 of the rectifier circuit including the device 15, while the electromagnet 11 is coupled to the condenser 18 of the rectifier circuit including the device 16, and there is provided a high-impedance means, such as resistors 24 and 25 in series, which is in common to the two control circuits. The timing system also includes means for sharply reducing the impedance of one of the control circuits for developing an electrical pulse therein to cause its associated device to initiate a camera exposure. This impedance-reducing means consists of the switch 23 which, upon operation of the blade 23a to open the circuit at contact 23b, disconnects the condensers 17 and 18 from the supply circuit and, upon the closing of the blade 23a on contact 23c, substantially simultaneously short-circuits the common high-impedance means comprising resistors 24 and 25.

The other of the control circuits, including the electromagnet 10, also includes in series a normally non-conductive electron discharge device, preferably in the form of a thyratron 26. There is provided a time-constant circuit responsive to operation of the pulse-developing means in the first control circuit including the electromagnet 11, specifically to the operation of the short-circuiting switch 23, for rendering the thyratron 26 conductive to develop a delayed pulse in its associated control circuit to cause its associated electromagnet 10 to complete an exposure. Specifically, the time-constant circuit includes a condenser 27 connected between the control electrode and cathode of the thyratron and a leakage circuit including a resistor 28 and an adjustable resistor 29 having an adjustable contact 29a connected to the junction of resistors 24 and 25. The time-constant circuit 27, 28, 29 is effectively coupled to the portion 25 of the high-impedance means common to the control circuits and to the control electrode of the thyratron 26 normally to bias it to a non-conductive state but, as explained hereinafter, responsive to operation of the short-circuiting switch 23 to render the thyratron conductive after a predetermined time interval. The resistor 29 included in the time-constant circuit is adjustable to adjust the timing of the camera exposure.

In considering the operation of the timing apparatus described, it will be assumed that the switch 21 is actuated to complete the circuit through the blade 21a and that the switch 23 is in the position illustrated, with the circuit completed through the contact 23b. Under these conditions, the alternating-current supply circuit terminals 14 cooperate with the rectifier circuits described to charge the condensers 17 and 18 to substantially peak potentials of opposite polarities with regard to their common junction. Under these conditions, a small current from the condenser 18 and its associated rectifier circuit will be bled through the resistors 24 and 25 and the electromagnet 11, but this current is insufficient to actuate the electromagnet. However, this current develops across resistor 25 a moderate negative bias potential which is applied through resistors 29 and 28 to the control electrode of thyratron 26 to maintain it non-conductive. If now the switch 23 is momentarily operated to open the circuit at contact 23b and close the circuit through the contact 23c, the high-impedance means including resistors 24 and 25 is short-circuited and the condenser 18 will substantially instantaneously supply a current pulse to the electromagnet 11 which is effective to actuate the shutter element B to initiate a camera exposure.

When the current pulse through the electromagnet 11 drops substantially to zero, the negative bias potential across the resistor 25 also drops substantially to zero. The removal of this negative bias from the control electrode of tube 26 would render it conductive but, due to the time constant of its grid circuit including condenser 27 and resistors 28 and 29, the potential of this control electrode decreases gradually so that it does not reach a value at which the thyratron 26 is rendered conductive until a definite and predetermined time interval. When this occurs and the thyratron 26 becomes conductive, the condenser 17 then rapidly discharges, sending a current pulse through the electromagnet 10 to actuate the shutter element A to complete the camera exposure. It is apparent that adjustment of the contact 29a of resistor 29 is effective to adjust the value of the resistance in the time-constant circuit and thus the time delay in the fall of the potential of the control electrode of the thyratron 26. Thus the exposure time may readily be adjusted over a wide range of values simply by adjusting the contact 29a.

In the operation just described, the switch 23 must open the circuit through the contact 23b and close the circuit through the contact 23c for the time required for a complete cycle of operation. When the camera exposure is completed, the switch 23 may be returned to its initial position. Thus when it is desired to provide exposure periods of considerable duration, the switch 23 may be of the locking type so as to maintain the circuit closed through the contact 23c until positively released by the operator. While the switch 23 is operated to close the circuit through the contact 23c, the thyratron 26 cannot conduct after the flow of the single current pulse representing the discharge of condenser 17, since its anode circuit is disconnected from the supply terminals 14 by the switch 23.

In certain applications it may be desirable positively to prevent operation of the thyratron 26 from a stray pulse or any pulse other than that developed in the control circuit including the electromagnet 11, as described above. The double-pole switch 21 serves this purpose. When the connection to the supply terminals 14 is interrupted at the blade 21a, the blade 21b includes a discharge path for condenser 17 through resistor 22 and the contact 23b of switch 23, thus assuring that no anode potential is applied to the thyratron 26 so that it is insensitive to such spurious pulses.

While the circuit values of the timing apparatus of the invention may be varied within a wide range depending upon the operating characteristics and the range of timing periods desired, there follow the circuit constants of one timing circuit providing satisfactory operation.

| | |
|---|---|
| Condensers 17, 18 | 6 microfarads. |
| Resistors 19, 20 | 100 ohms. |
| Rectifiers 15, 16 | 100 milliamp. selenium. |
| Resistor 24 | 100 kilohms. |
| Resistor 25 | 10 kilohms. |
| Condenser 27 | 0.064 microfarad. |
| Resistor 28 | 10 kilohms. |
| Resistor 29 | variable, 0 to 1 megohm. |
| Thyratron 26 | type 2D21. |
| Supply circuit 14 | 115 volts, 60 cycles. |

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a camera having a shutter mechanism including two independently operable shutter-actuating elements, a shutter-timing apparatus for effecting a precisely predetermined camera exposure comprising: a pair of electro-responsive devices adapted to be individually coupled to said elements; an electrical supply circuit; a pair of control circuits coupled to said supply circuit each including one of said devices; means for developing an electrical pulse in one of said control circuits to cause its associated device to initiate an exposure; a normally non-conductive electron discharge device included in the other of said control circuits; and an electrical time-constant circuit responsive to operation of said pulse-developing means for rendering said discharge device conductive to develop a delayed pulse in said other of said control circuits to cause its associated electro-responsive device to complete an exposure.

2. In a camera having a shutter mechanism including two independently operable shutter-actuating elements, a shutter-timing apparatus for effecting a precisely predetermined camera exposure comprising: a pair of electro-responsive devices adapted to be individually coupled to said elements; an alternating-current supply circuit; a pair of rectifier circuits coupled to said supply circuit; a pair of control circuits individually coupled to said rectifier circuits each including one of said devices; means for developing an electrical pulse in one of said control circuits to cause its associated device to initiate an exposure; a normally non-conductive electron discharge device included in the other of said control circuits; and an electrical time-constant circuit responsive to operation of said pulse-developing means for rendering said discharge device conductive to develop a delayed pulse in said other of said control circuits to cause its associated electro-responsive device to complete an exposure.

3. In a camera having a shutter mechanism including two independently operable shutter-actuating elements, a shutter-timing apparatus for effecting a precisely predetermined camera exposure comprising: a pair of electro-responsive devices adapted to be individually coupled to said elements; an alternating-current supply circuit; a pair of rectifier circuits coupled to said supply circuit, each including an energy-storage condenser; a pair of control circuits individually coupled to said condensers each including one of said devices; means for developing an electrical pulse in one of said control circuits to cause its associated device to initiate an exposure; a normally non-conductive electron discharge device included in the other of said control circuits; and an electrical time-constant circuit responsive to operation of said pulse-developing means for rendering said discharge device conductive to develop a delayed pulse in said other of said control circuits to cause its associated electro-responsive device to complete an exposure.

4. In a camera having a shutter mechanism including two independently operable shutter-actuating elements, a shutter-timing apparatus for effecting a precisely predetermined camera exposure comprising: a pair of electro-responsive devices adapted to be individually coupled to said elements; an electrical supply circuit; a pair of high-impedance control circuits coupled to said supply circuit each including one of said devices; means for sharply reducing the impedance of one of said control circuits to develop an electrical pulse therein to cause its associated device to initiate an exposure; a normally non-conductive electron discharge device included in the other of said control circuits; and an electrical time-constant circuit responsive to operation of said impedance-reducing means for rendering said discharge device conductive to develop a delayed pulse in said other of said control circuits to cause its associated electro-responsive device to complete an exposure.

5. In a camera having a shutter mechanism including two independently operable shutter-actuating elements, a shutter-timing apparatus for effecting a precisely predetermined camera exposure comprising: a pair of electro-responsive devices adapted to be individually coupled to said elements; an electrical supply circuit; a pair of control circuits coupled to said supply circuit each including one of said devices; high-impedance means common to said control circuits; means for substantially short-circuiting said high-impedance means for developing an electrical pulse in one of said control circuits to cause its associated device to initiate an exposure; a normally non-conductive electron discharge device included in the other of said control circuits; and an electrical time-constant circuit responsive to operation of said short-circuiting means for rendering said discharge device conductive to develop a delayed pulse in said other of said control circuits to cause its associated electro-responsive device to complete an exposure.

6. In a camera having a shutter mechanism including two independently operable shutter-actuating elements, a shutter-timing apparatus for effecting a precisely predetermined camera exposure comprising: a pair of electro-responsive devices adapted to be individually coupled to said elements; an electrical supply circuit; a pair of control circuits coupled to said supply circuit each including one of said devices; high-impedance means common to said control circuits; means for substantially short-circuiting said high-impedance means for developing an electrical pulse in one of said control circuits to cause its associated device to initiate an exposure; an electron discharge device included in the other of said control circuits; and an electrical time-constant circuit coupled to at least a portion of said high-impedance means and to said discharge device normally to bias it to a non-conductive state and responsive to operation of said short-circuiting means for rendering said discharge device conductive to develop a delayed pulse in said other of said control circuits to cause its associated electro-responsive device to complete an exposure.

7. In a camera having a shutter mechanism including two independently operable shutter-actuating elements, a shutter-timing apparatus for effecting a precisely predetermined camera exposure comprising: a pair of electro-responsive devices adapted to be individually coupled to said elements; an electrical supply circuit including a pair of energy-storage condensers; a pair of control circuits individually coupled to said condensers and each including one of said devices; high-impedance means common to said control circuits; switching means for disconnecting said condensers from said supply circuit and for substantially simultaneously short-circuiting said high-impedance means for developing an electrical pulse in one of said control circuits to cause its associated device to initiate an exposure; a normally non-conductive electron discharge device included in the other of said control circuits; and an electrical time-constant circuit responsive to operation of said short-circuiting means for rendering said discharge device conductive to develop a delayed pulse in said other of said control circuits to cause its associated electro-responsive device to complete an exposure.

8. In a camera having a shutter mechanism including two independently operable shutter-actuating elements, a shutter-timing apparatus for effecting a precisely predetermined camera exposure comprising: a pair of electro-responsive devices adapted to be individually coupled to said elements; an electrical supply circuit; a pair of control circuits coupled to said supply circuit each including one of said devices; means for developing an electrical pulse in one of said control circuits to cause its associated device to initiate an exposure; a normally non-conductive electron discharge device included in the other of said control circuits; and an electrical time-constant circuit responsive to operation of said pulse-developing means for rendering said discharge device conductive to develop a delayed pulse in said other of said control circuits to cause its associated electro-responsive device to complete an exposure, said time-constant circuit including an element adjustable to adjust the camera exposure.

References Cited in the file of this patent

UNITED STATES PATENTS

| 2,206,446 | Bereskin | July 2, 1940 |
| 2,577,774 | Lee | Dec. 11, 1951 |
| 2,632,133 | McNulty | Mar. 17, 1953 |
| 2,658,141 | Kurland | Nov. 3, 1953 |

FOREIGN PATENTS

| 553,949 | Great Britain | June 11, 1943 |

OTHER REFERENCES

Popular Science, January 1946, p. 186 cited.